United States Patent [19]
Andres et al.

[11] B 3,925,656
[45] Dec. 9, 1975

[54] PNEUMATIC CONTROL SYSTEM FOR SELF ALIGNMENT OF MOTOR VEHICLE HEADLIGHTS

[75] Inventors: Rudolf Andres, Sindelfingen; Hermann Möller, Aidlingen; Franz Seyfried, Sindelfingen, all of Germany

[73] Assignee: Daimler-Benz Aktiengesellschaft, Germany

[22] Filed: Apr. 27, 1973

[21] Appl. No.: 355,095

[44] Published under the Trial Voluntary Protest Program on January 28, 1975 as document no. B 355,095.

[30] Foreign Application Priority Data
Apr. 29, 1972 Germany............................ 2221320

[52] U.S. Cl. ............................ 240/7.1 LJ; 240/62.3
[51] Int. Cl.²............................................ B60Q 1/00
[58] Field of Search........................ 240/62.3, 7.1 LJ

[56] References Cited
FOREIGN PATENTS OR APPLICATIONS
1,506,590   11/1967   France............................... 240/62.3

*Primary Examiner*—Samuel S. Matthews
*Assistant Examiner*—Russell E. Adams, Jr.
*Attorney, Agent, or Firm*—Craig & Antonelli

[57] ABSTRACT

A pneumatically operating control system for the automatic alignment of motor vehicle headlights which consists of control members coordinated to one or both axles of the vehicle which cause alignment of the headlights to a constant light distance as a function of the change of the distance of the respective axle to the body of the vehicle by way of adjusting motors and a control shifting device; the control system is thereby fed with a vacuum and the control members are constructed as pressure modulators; an automatically operating valve is thereby arranged in each line or line system leading to the adjusting motors which during strong braking and acceleration eliminates the throttling action in the line or line system and leads to an immediate compensation of the change in angular value between the optical axis of the headlights and the road.

14 Claims, 6 Drawing Figures

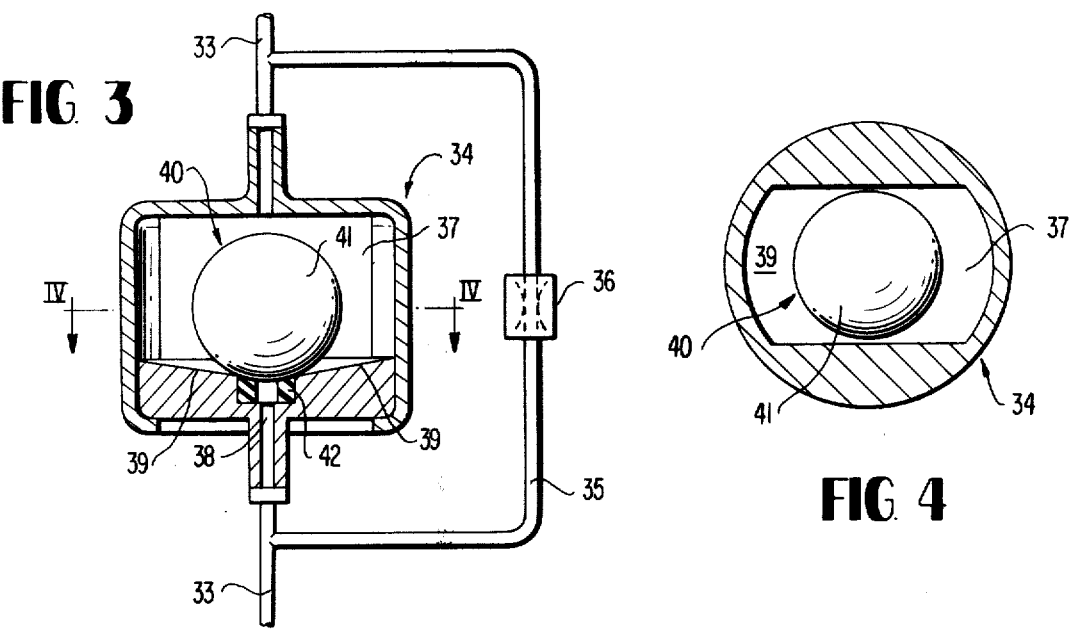
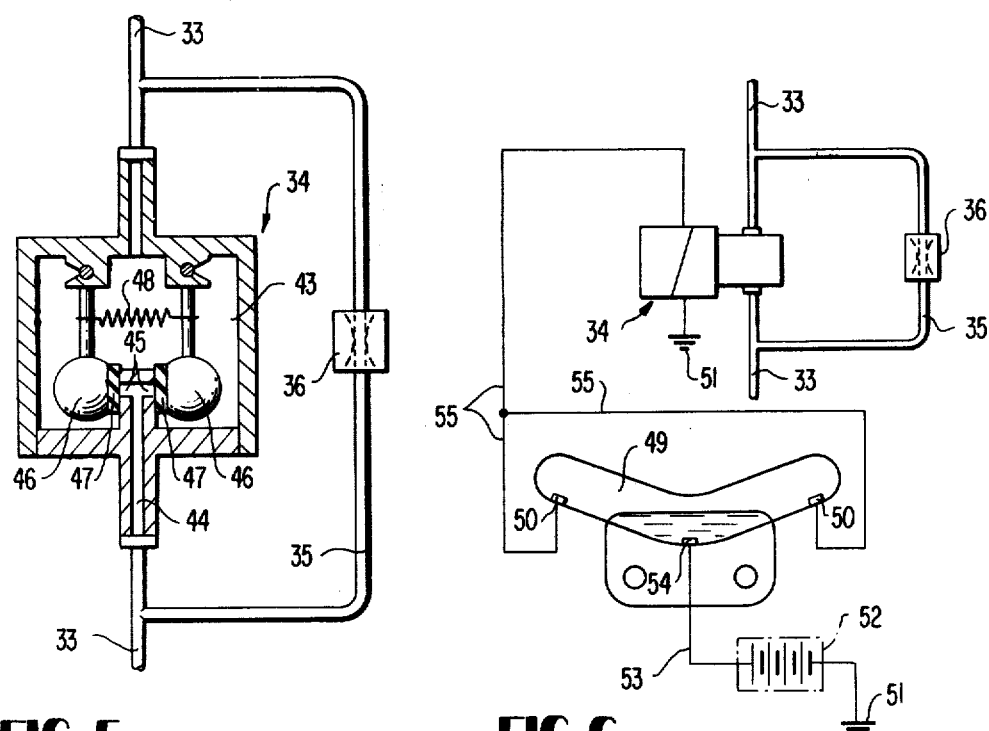

PNEUMATIC CONTROL SYSTEM FOR SELF ALIGNMENT OF MOTOR VEHICLE HEADLIGHTS

The present invention relates to a pneumatically operating control system for the automatic alignment of motor vehicle headlights, consisting of control members coordinated to one or both axles of the motor vehicle which align the motor vehicle headlights to a constant light distance in dependence on the change of the distance of the respective axle to the body of the motor vehicle by way of adjusting motors and a control shifting device, whereby the control system is fed with vacuum and the control members are constructed as pressure modulators as more fully disclosed in the German Pat. Application P 20 54 644.5 filed in the name of the assignee of the present application.

It has already been pointed out in the aforementioned German Application that by an appropriate matching of all line cross sections, the damping in the lines can be so selected that the headlight position can also be corrected during braking and acceleration operations while the control system does not respond to a higher frequency of the axle deflections—as occur, for example, when driving on poor roads.

It has been discovered that in many cases the constant throttling effect of the lines leads to an undesirable sluggish or inertia behavior. In particular, during emergency braking operations or when stepping down on the gas for quick accelerations, the necessary rapid adaptation of the headlight position cannot be attained.

It is the aim of the present invention to provide a system avoiding the aforementioned disadvantage which in particular during braking and acceleration operations leads to an immediate light distance adaptation of the motor vehicle headlights.

Accordingly, with a control system of the aforementioned type it is proposed to arrange according to the present invention in each line leading to the adjusting motors an automatically operating valve which during strong braking and acceleration operations cancels out the throttling effect in the line and leads to an immediate compensation of the change of the angular value between the optical axis of the headlights and the road surface.

In one advantageous embodiment of the present invention, the interior space of the valve includes a track for a roller body guided in the vehicle longitudinal direction which track drops off on both sides toward an aperture disposed intermediate the two sides whereby the roller body closes the aperture in its normal rest position.

Appropriately, the roller body may be constructed in this embodiment as ball and the orifice of the aperture may be delimited by a sealing ring aligned or flush with the adjoining running surface of the track for the ball.

In another embodiment of the present invention in which strong vertical accelerations as occur, for example, when driving over deep holes, remain neglected, a channel which branches T-shaped, terminates in the interior space of the valve whose two mutually opposite apertures are closed off by two swingingly suspended masses arranged one behind the other in the vehicle longitudinal direction in the normal rest position thereof.

The swingingly suspended masses may be each provided at the side facing the nearer aperture thereof with a sealing plate and may seal off —under prestress—the apertures in the normal rest position thereof.

It may also be of advantage to construct the valve as electromagnetically actuated displacement valve whereby a mercury switch operatively connected with and actuating the displacement valve may be provided with one switching contact surrounded by mercury during strong acceleration operations and with one switching contact surrounded by mercury during large decelerations.

Accordingly, it is an object of the present invention to provide a pneumatically operated control system for the automatic alignment of motor vehicle headlights which eliminates by simple means the aforementioned shortcomings and drawbacks encountered in the prior art.

Another object of the present invention resides in a pneumatically operated control system for the automatic alignment of motor vehicle headlights which assures a rapid adaptation of the headlight position when strongly depressing the brakes or when stepping on the gas.

A further object of the present invention resides in a control system which leads to an immediate adaptation of the light distance of the motor vehicle headlights, especially during braking and acceleration operations of the motor vehicle.

These and further objects, features, and advantages of the present invention will become more apparent from the following description when taken in connection with the accompanying drawing which shows, for purposes of illustration only, several embodiments in accordance with the present invention, and wherein:

FIG. 3 is a somewhat schematic view, partially in cross section, of one embodiment of a valve according to the present invention which responds to strong acceleration and deceleration operations of the vehicle and is arranged in the feed line of the adjusting motors;

FIG. 4 is a cross-sectional view, taken along line IV—IV of FIG. 3;

FIG. 5 is a somewhat schematic view, partially in cross section, of a modified embodiment of a valve with swingingly suspended masses as closure members according to the present invention which operates in an analogous manner to the valve illustrated in FIGS. 3 and 4; and FIG. 6 is a schematic view of a further modified embodiment of a valve construction according to the present invention, with an electromagnetic actuation and with a control by way of a mercury switch.

Figure 1:
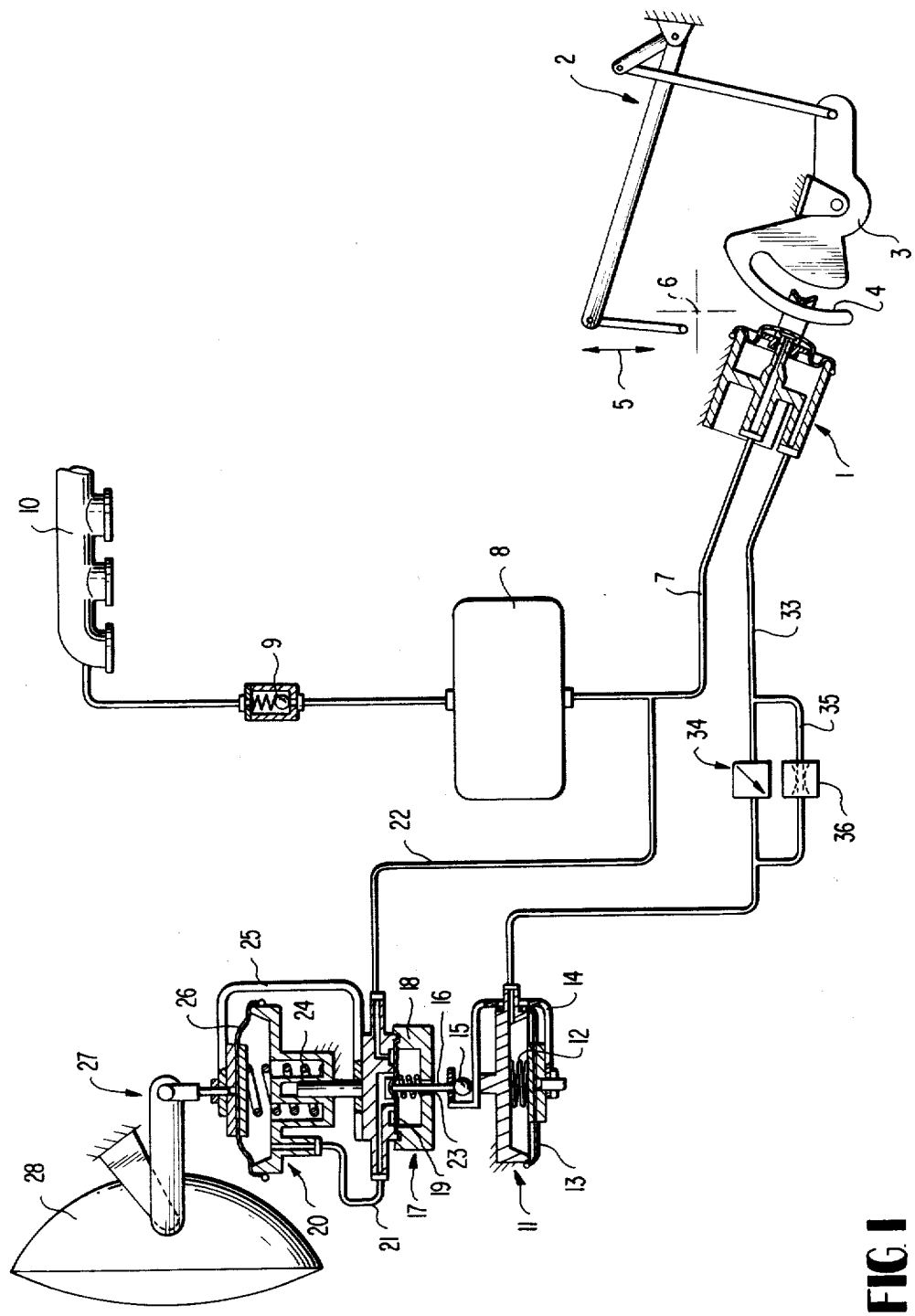
FIG. 1 is a schematic view, partially in cross section, of a control system according to the present invention which is controlled by way of a pressure modulator arranged preferably at the rear axle.

Referring now to the drawing wherein like reference numerals are used throughout the various views to designate like parts, and more particularly to FIG. 1, a pressure modulator generally designated by reference numeral 1 is secured in this figure at the body of a motor vehicle. The pressure modulator 1 detects the vertical movements 5 of the rear axle 6 by way of a linkage generally designated by reference numeral 2 and a control cam 4 arranged at a lever 3. The pressure modulator 1 is also connected with a suction pipe 10 of an internal combustion engine (not shown) by way of a line 7 in which are interconnected a storage or reservoir tank 8 and a check valve 9. An adjusting motor generally designated by reference numeral 11 is actuated with the vacuum modulated by the pressure modulator 1 in dependence on the position of the body with respect to the rear axle 6 against the force of a spring 12 whereas its diaphragm 13 is connected with a mushroom-shaped piston 16 of a control shifting device generally designated by reference numeral 17 by way of an angularly bent rod 14 extended about the adjusting motor 11 and a ball joint 15. The control shifting member 17 has such a construction that the mushroom-shaped piston 16 displaceably arranged in a flat cylindrical housing 18 so acts, depending on the movements of the diaphragm 13, on a diaphragm 19 of the control shifting member 17 that either a preferably flexible line 21 is connected with an also preferably flexible line 22 branching off from the line 7 or that the line 21 is in communication with the outside atmosphere by way of an aperture 23 in the bottom of the housing 18—which simultaneously receives the piston rod of the mushroom-shaped piston 16 with play.

The vacuum which builds up in a second adjusting motor generally designated by reference numeral 20 acts on a diaphragm 26 which is retracted against the pressure of a spring 24. An angularly bent adjusting rod 25 which is extended about the adjusting motor 20 is connected at one end thereof with the diaphragm 26 of the adjusting motor 20 and at the other end with the housing 18 of the control shifting member 17. An adjusting linkage generally designated by reference numeral 27 for changing the position of the headlights 28 adjoins the diaphragm 26.

Figure 2:
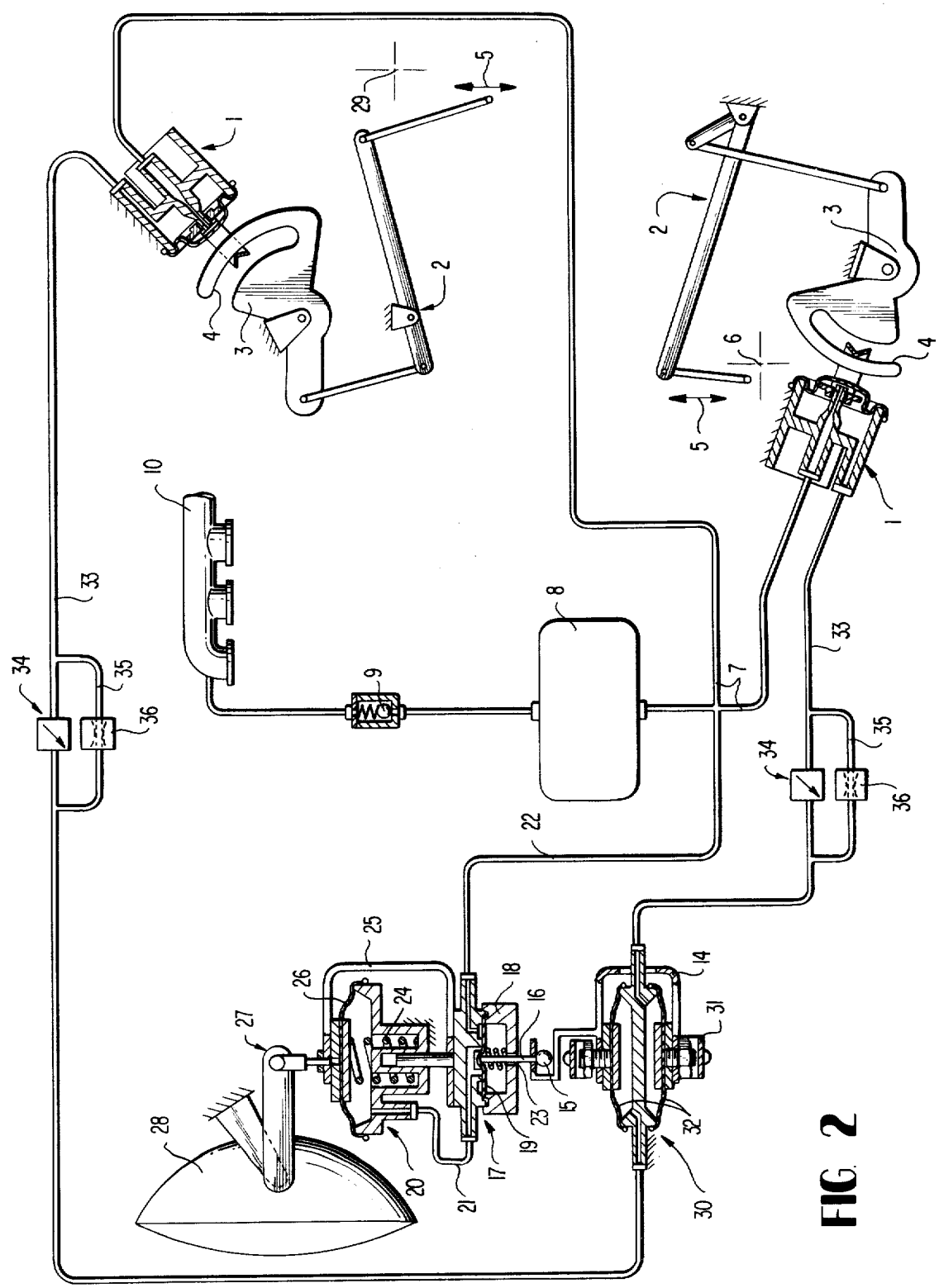
FIG. 2 is a schematic view, partially in cross section, of a modified embodiment of a control system according to the present invention which is controlled by two pressure modulators.

The embodiment according to FIG. 2 corresponds far-reachingly to that according to FIG. 1. Differing from the embodiment of FIG. 1, two pressure modulators 1 are provided in the embodiment according to FIG. 2 of which one is coordinated to the rear axle 6 and the other to the front axle 29. Thus, two modulated vacuum pressures are available which act on a common, double-acting adjusting motor generally designated by reference numeral 30 against the force of a spring 31 arranged on the outside of the adjusting motor 30 and extending about the same. As a result thereof, the movements of the two axles of the motor vehicle are combined into a single shifting magnitude.

The arrangement described so far with reference to FIGS. 1 and 2 essentially corresponds to those described in the aforementioned German application, the subject matter of which is incorporated herein to the extent necessary for an understanding of the instant application.

In both FIGS. 1 and 2 described hereinabove, an automatically operating valve generally designated by reference numeral 34 is interconnected according to this invention in the lines 33 leading to the adjusting motors 11 and 30, respectively. The automatically operating valve 34 lifts the throttling effect in the line 33 during strong braking and acceleration operations. As symbol for this throttling effect of the line system which can also be realized by a separate throttling member, a throttle 36 is indicated schematically in a line 35 connected with the line 33 and extending in parallel thereto.

The automatically operating valve 34 may be constructed as shown in FIGS. 3 and 4. A track 39 for a roller body generally designated by reference numeral 40 which is guided in the vehicle longitudinal direction, is disposed in the interior space 37; the track 39 thereby drops off on both sides in the direction toward an aperture 38 located in the center. The roller body may be constructed thereby as ball 41. The ball 41 rests in its normal position on a sealing ring 42 flush with the adjoining running surface or track 39 and thus covers the aperture 38.

The valve 34 is so inserted and interconnected into a line 33 as regards the vertical position that with the beginning of a positive or negative acceleration, the ball 41 is sucked against the sealing ring 42 by the vacuum acting from the pressure modulator (FIGS. 1 and 2). With increasing acceleration or deceleration, the ball 41 rolls away from the sealing ring 42 along the track 39 by reason of its inertia and thus releases or opens up the aperture 38. The vacuum effect can now continue in by-passing relationship to the line 35 and the throttle 36. In order that the valve 34 does not respond to cross accelerations of the vehicle, the ball 41 is guided laterally—as can be seen in particular from FIG. 4.

Another embodiment of a valve 34 is illustrated in FIG. 5. A T-shaped branching channel 44 terminates in the interior space 43 of the valve 34. Its two mutually opposite apertures 45 can be closed off by two swingingly suspended masses 46 disposed one behind the other in the vehicle longitudinal direction which, for this purpose, carry sealing plates 47 on the sides facing the apertures 45. The response sensitivity of the valve 34 is dependent on the magnitude of the prestress with which the swingingly suspended masses 46 act on the apertures 45. This prestress may—as illustrated in FIG. 5—be achieved by a spring 48. The same effect is also achieved in that the suspension points of the inertia masses 46 are moved closer to one another.

The just-described valve 34 is so inserted as regards its vertical position into the line 33 that one of the masses 46 is moved away from the respective aperture 45 coordinated thereto by the acceleration forces while the other of the masses 46 is moved away from the respectively coordinated aperture 45 by the deceleration forces. If one of the apertures 45 is in communication with the interior space 43, then the vacuum continues in by-passing relationship to the line 35 and the throttle 36. During strong vertical accelerations as occur, for example, when driving through impact holes in the road, this valve 34 is not influenced.

A still further embodiment of a valve 34 is illustrated in FIG. 6 which is constructed as electromagnetically actuated displacement valve. A mercury switch 49 is provided with two switching contacts 50 which are so arranged that one is circumcirculated by mercury in case of a strong deceleration action while the other is circumcirculated by mercury in case of a large acceleration and thereby establishes a connection in an energizing circuit which leads to an opening of the valve 34. As in the other embodiments, the vacuum effect can then continue in by-passing relationship of the line 35 and of the throttle 36.

The vehicle battery 52 connected with its negative terminal to the vehicle ground 51 serves as voltage source, whose positive terminal is connected by way of a line 53 with a contact 54 surrounded by mercury. A line 55 connected to the switching contacts 50 is connected to the magnet coil of the displacement valve which is also connected with the vehicle ground 51.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A pneumatically operating control system for the automatic alignment of motor vehicle headlights which includes control means coordinated to at least one axle of the motor vehicle which align the motor vehicle headlights to a substantially constant light distance in dependence on the change of the distance of the respective axle to the body of the motor vehicle by way of adjusting motor means and control shifting means, a vacuum supply means operatively connected with the control system, and pressure modulator means forming part of the control means for modulating the vacuum pressure in the control system, characterized in that an automatically operating valve means is arranged in a line means leading from said pressure modulator means to the adjusting motor means, said valve means being operable to substantially eliminate the throttling effect in said line means during strong braking and acceleration operations and thereby leading to an essentially immediate compensation of the change in angular value between the optical axis of the headlights and the road surface.

2. A control system according to claim 1, characterized in that said control means are coordinated to both axles of the vehicle.

3. A control system according to claim 1, characterized in that said valve means includes an interior space, a track means within said interior space dropping off on both sides in the direction toward an aperture means, a roller body means guided on said track means in a substantially vehicle longitudinal direction, said roller body means covering the aperture means in its normal position.

4. A control system according to claim 3, characterized in that said roller body means is constructed as ball and in that the orifice of the aperture means is delimited by a sealing ring substantially flush with the adjoining track means.

5. A control system according to claim 4, characterized in that said control means are coordinated to both axles of the vehicle.

6. A control system according to claim 1, characterized in that a substantially T-shaped channel means terminates in the interior space of the valve means, said channel means being provided with two mutually oppositely disposed aperture means in its branched connection, and two swingingly suspended mass means arranged one behind the other in the vehicle longitudinal direction for closing off said aperture means in the normal rest position of said mass means.

7. A control system according to claim 6, characterized in that the mass means are provided each on the side facing the respective nearer aperture means with a sealing plate and close off the aperture means in the normal rest position.

8. A control system according to claim 7, characterized in that the mass means close off the aperture means under prestress.

9. A control system according to claim 8, characterized in that said control means are coordinated to both axles of the vehicle.

10. A control system according to claim 6, characterized in that the mass means close off the aperture means under prestress.

11. A control system according to claim 1, characterized in that the valve means is constructed as electromagnetically actuated displacement valve, and in that a switch means is operatively connected with said electromagnetically actuated displacement valve for actuating the latter during strong accelerations and strong decelerations.

12. A control system according to claim 11, characterized in that said switch means is a mercury switch having one switching contact which is surrounded with mercury during strong acceleration operations and another switching contact which is surrounded with mercury during strong deceleration operations.

13. A control system according to claim 12, characterized in that said switching contacts are disposed essentially in the vehicle longitudinal direction.

14. A control system according to claim 13, characterized in that said control means are coordinated to both axles of the vehicle.

* * * * *